INVENTOR.
EDWIN N. PHILLIPS

BY Charles J. Eldukin
ATTORNEY

INVENTOR.
EDWIN N. PHILLIPS
BY Charles J. Eldukin
ATTORNEY

INVENTOR.
EDWIN N. PHILLIPS
BY Charles J. Elderkin
ATTORNEY

INVENTOR.
EDWIN N. PHILLIPS
BY Charles J. Elderkin
ATTORNEY

United States Patent Office 3,119,965

Patented Jan. 28, 1964

3,119,965

SYSTEM FOR SPLITTING ULTRA-HIGH-FREQUENCY POWER FOR DIVIDED TRANSMISSION

Edwin N. Phillips, St. Petersburg, Fla., assignor to Electronic Communications, Inc., St. Petersburg, Fla., a corporation of New Jersey Filed Aug. 8, 1960, Ser. No. 48,010

3 Claims. (Cl. 325—180)

This invention relates generally to ultra-high-frequency transmitting systems and more particularly to such systems in which ultra-high-frequency power is split or divided and fed over parallel paths to an antenna array.

Until recent times, the usual arrangements employed in ultra-high-frequency transmitters have employed cascaded stages exclusively. Though side circuits have sometimes been employed, these have been used to provide special functions (i.e., modulators, automatic volume control and voice limiters, automatic frequency control), and the main power flow has always proceeded from stage to stage successively, being increased as it proceeded along the amplifier line.

Certain drawbacks are involved in such conventional prior-art systems. One such disadvantage is that the failure of a single electrical component, insignificant in itself, can stop the signal flow until the component is either repaired or replaced. A considerable premium is placed upon the operator's knowledge of the equipment and upon his ability to trouble-shoot the equipment and, consequently, upon his ability to replace faulty components quickly. The only practical way heretofore proposed to correct such failures without requiring appreciable off-the-air time has been the installation of a complete duplicate transmitter in standby condition. When the output-power sensor (which could be an animate operator reading an antenna current meter) determines that transmission from the operating transmitter has been interrupted, the standby transmitter is placed in operating condition and the inoperative transmitter shut down for repair. While use of a duplicate, standby transmitter is sometimes feasible for ground-based installations, even with the double initial equipment cost, the additional weight and power demand of a standby transmitter is not permissible in other cases, as where the installation is aboard an aircraft.

Another disadvantage of conventional transmitting systems lies in the fact that application of a single input port for an antenna array places all power subdivision and phase grading burdens on the antenna designer. Not only must he devise an antenna array to provide reasonably satisfactory beam width and input-VSWR (voltage standing wave ratio) over a fairly broad frequency band, but also he must work with the highest power level existing anywhere in the entire transmission system.

Passive ultra-high-frequency power splitters or dividers are broadly known in the prior art. In the ultra-high-frequency range, only certain types of passive diplexers are suitable for use as power dividers. Ordinary T connections are impractical because a change in one load affects the generator power output so that the power applied to all loads is usually altered. In the frequency range of 225–400 mc., the only passive diplexer which might be of use is that known as a hybrid ring or "ratrace." However, use of such a device involves disadvantages which overshadow the advantages. For example, isolation between the outputs of the divider is desirable and, even though shunt-connected hybrid rings possess between 25 db and 30 db of directivity or isolation between output ports when operating on the frequency for which they are designed, this isolation falls off rapidly with deviation from the design frequency and the degree of isolation at the extremes of the 225–400 mc. band is not suitable even though the design frequency be centered arithmetically or geometrically within this frequency span.

Another disadvantage in the use of the coaxial hybrid ring divider which limits its usefulness is the fact that a power division ratio in multiples of only 1:2 is available so that outputs of only 1:2, 1:4, 1:8, 1:16, etc., are available. Any arbitrary power subdivision is not available, as, for instance, division following the factor train of 1:2, 1:3, 1:4, 1:5, 1:6, etc. Furthermore, half of the hybrid ring outputs are antiphased relative to the other outputs so that phase inverters must be inserted following power division with the result that, on this account alone, more frequency sensitivity results. Also, in such an arrangement, each signal before appearing at an output port must pass through three successive hybrid rings in cascade so that the band width over which the eight outputs are mutually isolated is less than that over which two output ports on any one hybrid ring diplexer are satisfactorily isolated.

In hollow-core guided-mode transmission systems, a comparable device is the hybrid tee which, when completely matched on all four arms, is known as a Magic Tee. Its directivity or isolation peaks about 40 db, but it too is a narrow band diplexer, is purely passive in nature and is subject to the same disadvantages as the hybrid ring.

Although isolation between adjacent output ports is greatly to be desired, its practical attainment becomes more and more debatable as the number of desired output ports increases. Hence, this criterion of quality must be reduced in the practical case of multiple output ports although it is certainly desirable.

Even more desirable than a high degree of isolation is an output which is divided an integral number of times. Divisions by 2, 3, 4, 5, etc., are desired rather than the divisions by 2, 4, 8, 16, etc., inherently imposed by the diplexing nature of cascaded passive hybrid rings, tees and the like.

It is accordingly a principal object of this invention to provide an ultra-high-frequency system with an active power splitter for applying an ultra-high-frequency signal in parallel paths to an antenna array.

Another object is to provide such a transmitting system with a power splitter of the cavity amplifier type.

Still another object is to devise an ultra-high-frequency transmitting system with an active power splitter which divides the signal into an arbitrary number of portions.

A further object is to provide such a transmitting system with an active power splitter providing parallel output signals to an antenna array with such signals being selectively and individually amplified.

A still further object is to provide an ultra-high-frequency transmitting system with an active power splitter supplying parallel outputs to an antenna array, the signals being selectively controlled in phase to control the directivity of the radiation from the antenna array.

To accomplish the foregoing and other objects, the invention provides an ultra-high-frequency transmitting system having a frequency generator providing output signals which are applied to an active ultra-high-frequency power dividing device having a plurality of output ports. Each output port of the power splitter is connected to one element of an antenna array which provides a directional ultra-high-frequency radiation. The active power splitter can provide amplification of the ultra-high-frequency signal and additional amplification can be provided for each of the parallel signals between the output ports and their respective antenna elements. This additional amplification can be selectively controlled externally, either to maintain the amplification of all the parallel output signals constant or to vary the amplification of the output signals relative to each other. In addition, the relative phases of the parallel output signals can be controlled selectively externally either to maintain all output signals in phase or to change the relative phases of the output signals in order to alter the directivity of the antenna array.

In order that the manner in which the foregoing and other objects are achieved in accordance with the invention can be understood in detail, reference is had to the accompanying drawings, which form a part of this specification, and wherein.

Figures 1, 2, 3, 4:
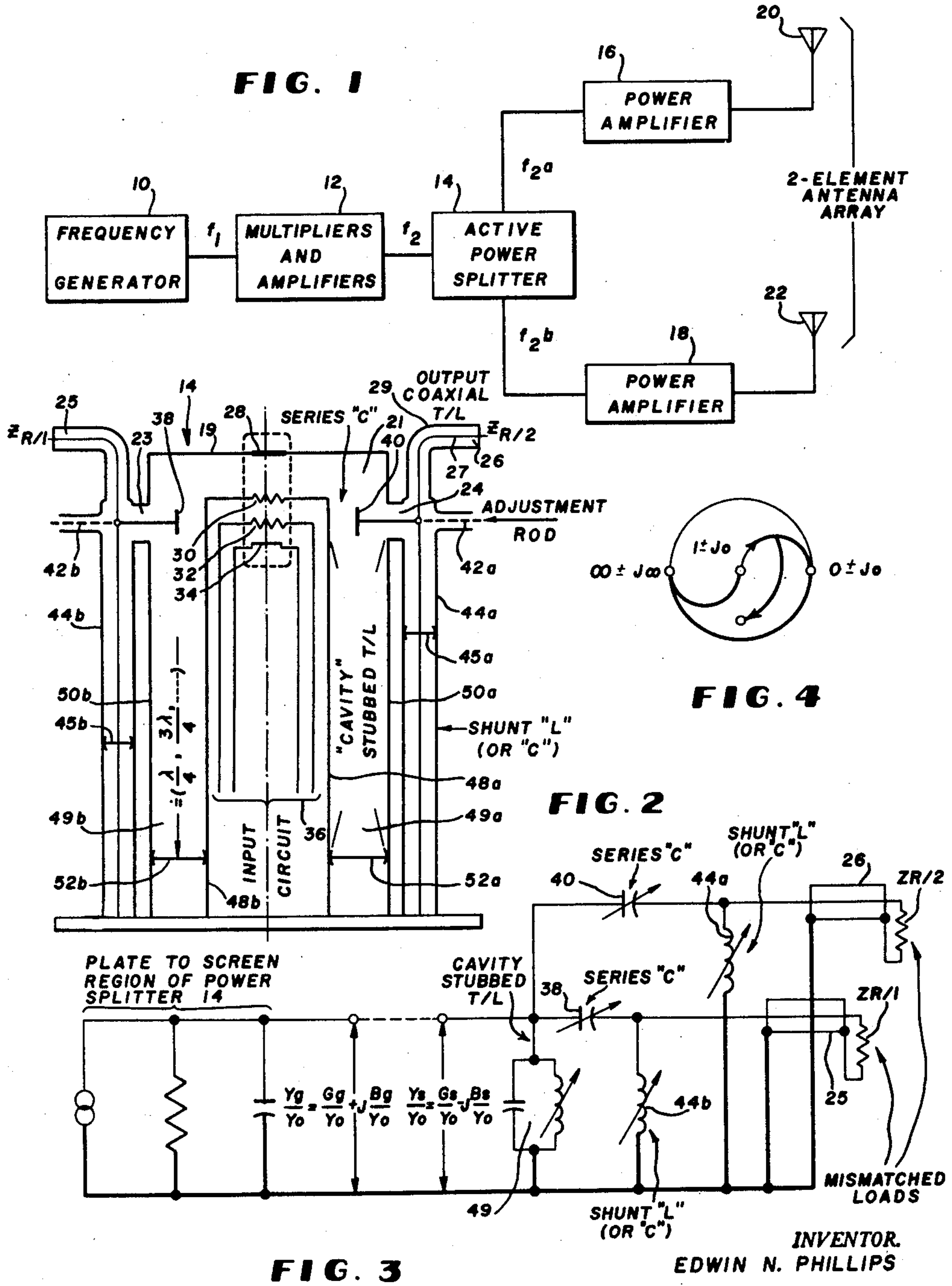
FIG. 1 is a schematic diagram of a ultra-high-frequency transmitting system embodying the invention.
FIG. 2 is a schematic diagram of an active power splitter employed in the system of FIG. 1.
FIG. 3 is a diagram of an approximate equivalent electrical circuit of the power splitter shown in FIG. 2.
FIG. 4 is an equivalent Smith chart form of admittance diagram for the circuit shown in FIG. 3.
Figure 6B:
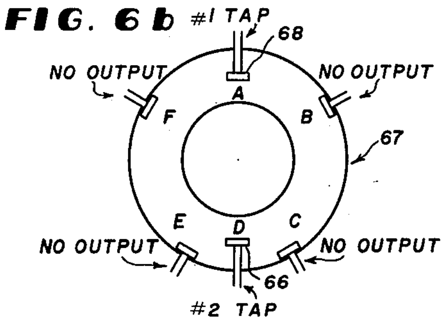
Figure 6A:
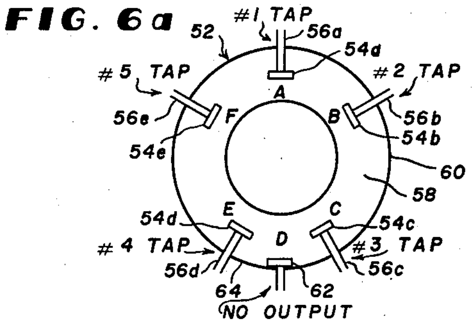
Figure 7A:
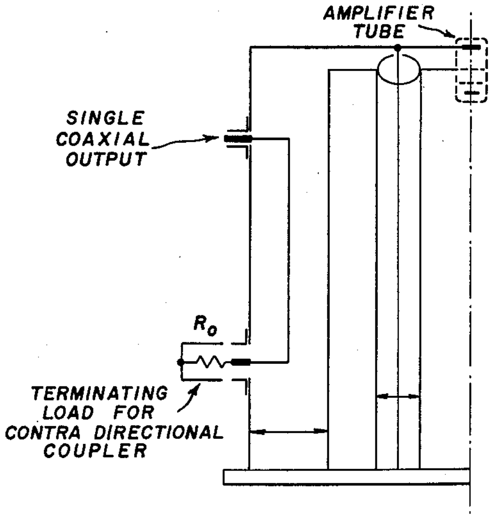
Figure 7B:
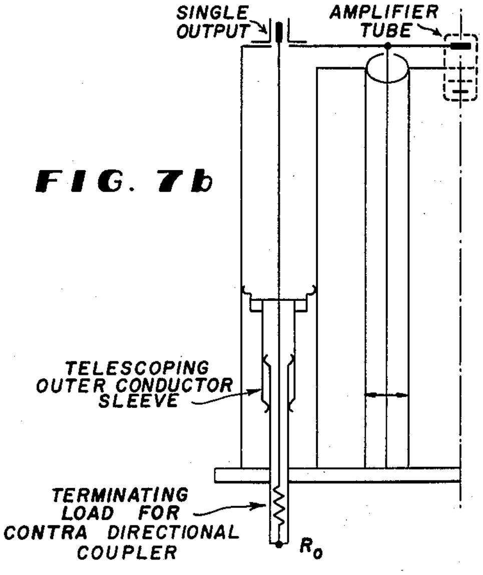
Figure 8:
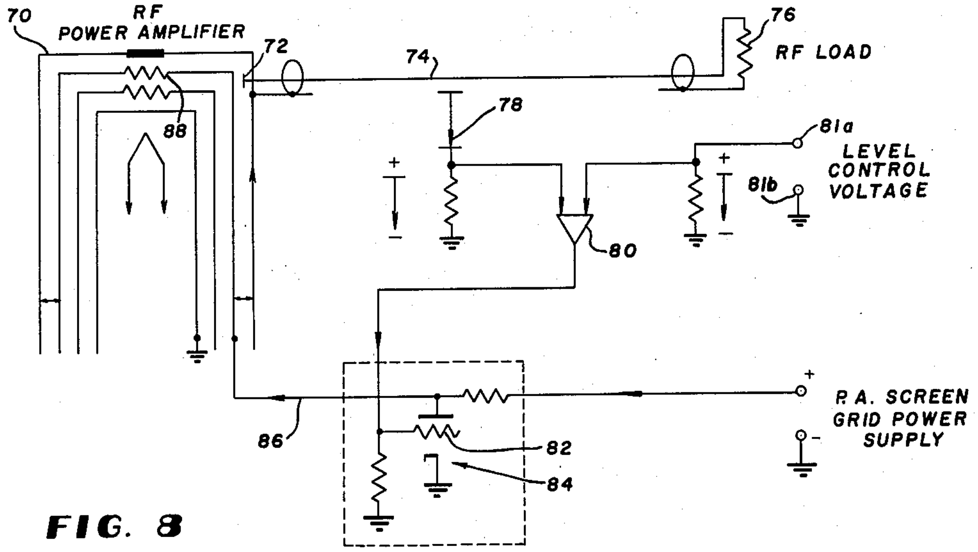
Figure 9:
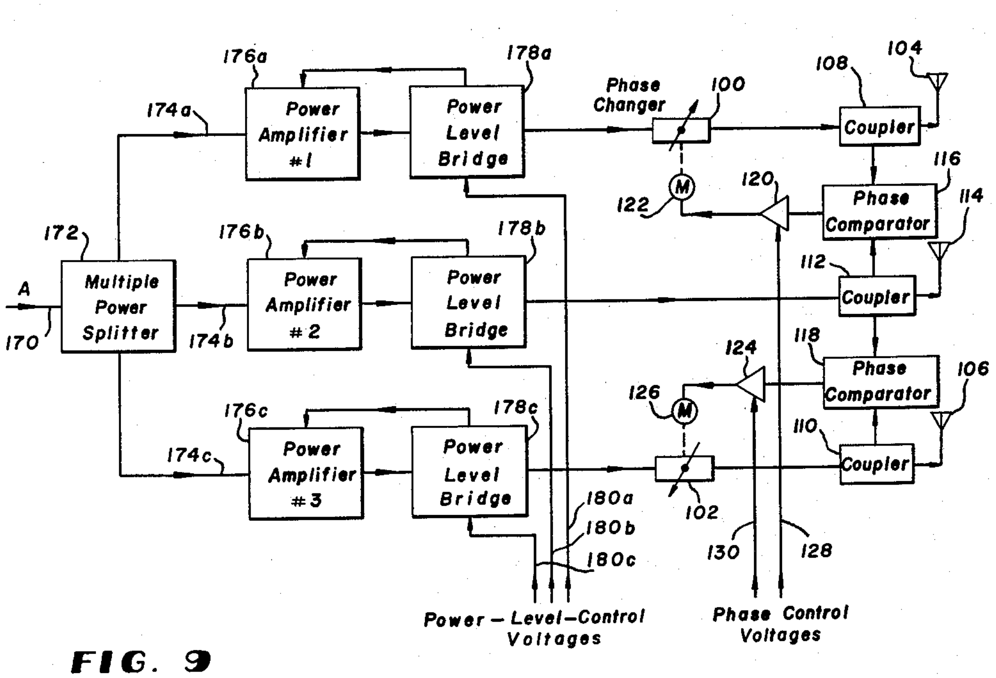
Figure 10B:
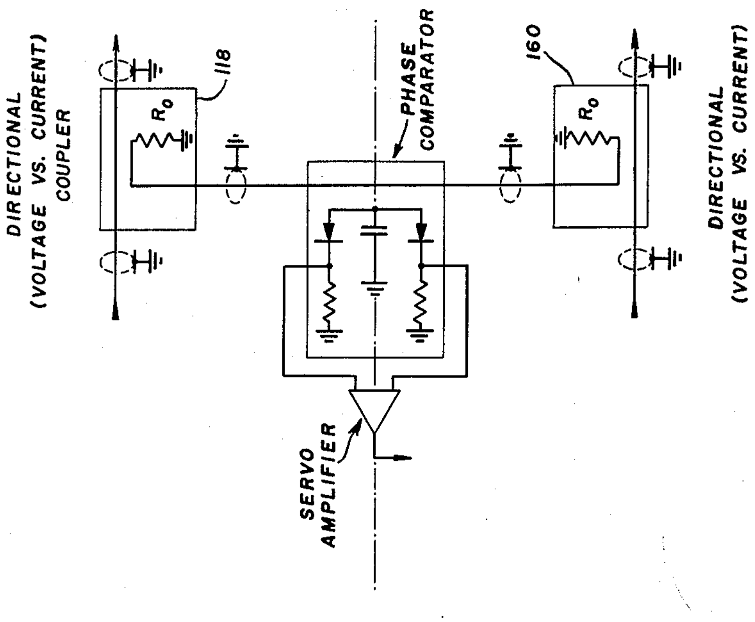
Figure 10A:
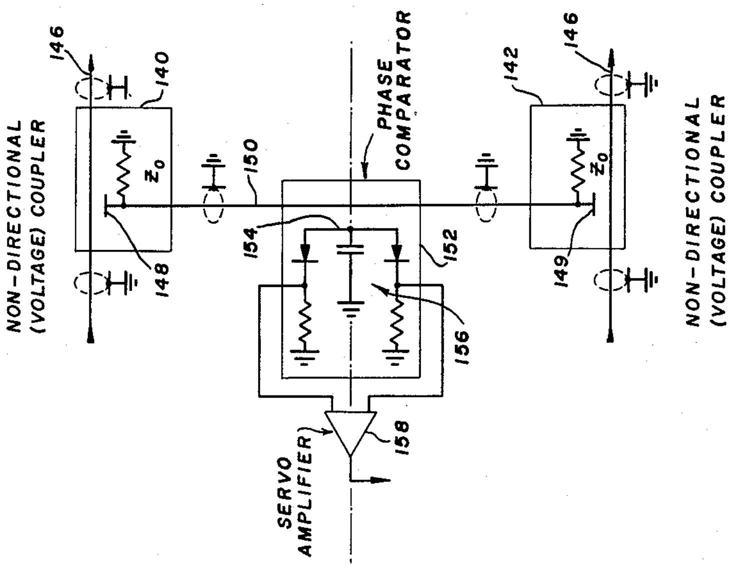

FIGS. 6*a* and 6*b* are diagrammatic cross-sectional views of a power splitter in accordance with the invention;

FIGS. 7*a* and 7*b* show two forms of contra-directional coupling devices utilized as power splitters in the system of FIG. 1;

FIG. 8 is a schematic diagram of a power regulating circuit for use in the transmitting system of FIG. 1;

FIG. 9 is a schematic diagram of an ultra-high-frequency transmiting system embodying the features of this invention; and FIGS. 10*a* and 10*b* are schematic diagrams of phase control circuits for use in the transmitting system of FIG. 9.

Turning now to the drawings in detail, FIG. 1 illustrates a rudimentary form of an ultra-high-frequency (hereinafter UHF) transmitting system embodying this invention. A frequency generator 10 provides a signal $f_1$ which is applied to a group of multipliers and buffers amplifiers, represented by block 12, to amplify signal $f_1$ and raise it to an ultra-high-frequency, so providing a signal $f_2$. Signal $f_2$ is applied to a power splitter of the UHF amplifier type. In this exemplary case, the power splitter has two output ports and therefore divides the signal $f_2$ into two UHF output signals $f_{2a}$ and $f_{2b}$, each having one half the power and the same frequency as the original signal $f_2$. These half-power signals are applied to corresponding UHF power amplifiers 16 and 18 and thence to UHF radiating elements 20 and 22, respectively, arranged in a directional array.

With such an arragnement, it can be seen that the beamed or directional antenna pattern is formed with exterior space acting as the signal combining agent. Because of the parallel paths provided by power splitter 14, should one of the power amplifiers 16 and 18 fail, at least partial transmission continues. In addition, since power splitter 14 and power amplifiers 16 and 18 are all of the same basic structure, they are interchangeable and further facilitate maintenance and reliability of the system. While it is still true that cessation of the signal output from frequency generator 10 or from multiplier-amplifier combination 12 could silence the overall system, these units operate at such low power levels that automatic substitution of another physically small twin unit, by means of a small relay, can be accomplished easily in response to operation of appropriate sensors located at the output ports of the failed units.

FIG. 2 illustrates diagrammatically a particularly advantageous form of the UHF power splitter 14, constituting an active diplexer with capacitive output taps. Power splitter 14 is a diplexer in that it has only two output ports 23 and 24 opening from the cavity chamber 21. However, it is to be understood that any number of output ports can be incorporated in the power splitter. As illustrated, the device includes a housing 19, a plate 28, a cavity screen grid 30, a cavity control grid 32, and a cathode 34. An input UHF signal is applied across grid 32 and cathode 34 through input circuit 36 and the two output signals are taken off by the capacitor output taps 38 and 40 located at output ports 23 and 24. Output coaxial transmission lines 25 and 26 are connected to ports 23 and 24, respectively, to supply power to loads $Z_{R/1}$ and $Z_{R/2}$. $Z_R$ is a generic load terminating an electrically long transmission system, and is measured in complex ohms. Since this power splitter is symmetrical, only the right-hand or "*a*" side of FIG. 2 will be described below, it being understood that corresponding parts on the left-hand or "*b*" side are identical.

Capacitive tap 40 is in the form of a plate or disc and can be adjusted within chamber 21 by means of an adjustment rod **42*a* as explained hereinafter in more detail. An external shunt stub 44*a* is provided at output port 24, and can be either inductive or capacitive. The presence of stub 44*a*** gives three degrees of freedom, one of these being redundant since only two degrees of freedom are needed for the conjugate match $$(1) \qquad \frac{Y_s}{Y_o}=\frac{G_s}{Y_o}\pm J\frac{B_s}{Y_o} \text{ (complex numeric)}$$

when the internal admittance of the generator formed by screen grid 30 and plate 28 has a value of $$(2) \qquad \frac{Y_g}{Y_o}=\frac{G_g}{Y_o}\pm J\frac{B_g}{Y_o} \text{ (complex numeric)}$$

In the above, $Y_s/Y_o$ denotes the complex input admittance of a network when normalized against the surge admittance (or "characterized admittance"), $Y_o$ of the transmission system; this includes: $G_s/Y_o$ where this is the normalized conductance of the input admittance, and $B_s/Y_o$ where this is the normalized susceptance of the input admittance. The expressions $Y_g/Y_o$, $G_g/Y_o$, and $B_g/Y_o$ relate to the generator admittance in the same respective fashion; again, each term is normalized against the surge admittance of the transmission system.

An input stub transmission line **49*a* is formed by the walls 48 and 50 of housing 19 and contains a movable shorting piston 52 for adjusting its electrical length. Assume that the position of piston 52 is such that stub 49*a* is some odd multiple of a quarter wave length of the UHF signal, thereby rendering the stub electrically inert since it then corresponds to the well known "metallic insulator." External stub 44*a* and the variable coupling of the capacitive disc 40 then act as an L network with a series capacitor leading element (capacitive disc 40) and a shunt inductor trailing element (external stub 44*a*), as shown in the approximate equivalent electrical circuit under such conditions in FIG. 3. The Smith chart form of admittance diagram in FIG. 4 illustrates that such an arrangement is capable of matching only over a certain portion of the chart. Here, of course, each such L network on each of the two output ports 23 and 24** must present an impedance such that, when the two are summed, they present a net input impedance to the vacuum tube generator which is the complex conjugate to the generator complex admittance.

Figure 5:
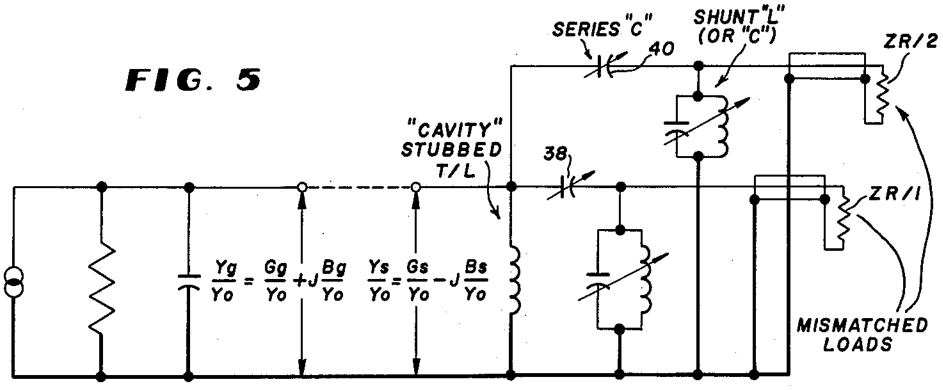
FIG. 5 is a diagram of another form of approximate equivalent electrical circuit for the power splitter shown in FIG. 2.

In FIG. 5, there is shown another equivalent electrical circuit of the power splitter in FIG. 2 for conditions in the opposite extreme. Here, the external shunt stub **44*a* is anti-resonant so that the internal output cavity presents a shunt inductor leading element with two or more series capacitor trailing elements 38, 40**, etc.

FIGS. 6*a* and 6*b* show schematic cross-sectional views of power splitters similar to that shown in FIG. 2 with the exception that more than two output ports are employed. For example, in FIG. 6*a* there is illustrated a five-way multiplexer or power splitter 52 having five output ports as exemplified by the capacitive taps or discs 54*a*–54*e*. Each disc has an associated adjusting rod 56. These taps are all placed within the cavity 58 formed by the chamber 60. A sixth capacitive tap 62 is shown withdrawn against the outer wall 64 of chamber 60. The five capacitive taps 54*a*–54*e* are each connected to a load. The sixth disc 62 is retracted into engagement with the outer chamber wall so that its associated port is closed off effectively and no power enters its associated output line in any substantial quantity. FIG. 6*b* shows a two-way power splitter or a diplexer 67 in which four of the capacitive discs are retracted and a sixth disc 66 is placed in the cavity so that, in co-operation with the disc 68, a diplexer is formed. If the plate 66 were also retained at the outer chamber wall, the device would then function as a single output port conventional UHF amplifier.

It is advantageous to fix the coupling discs or taps at equally spaced locations around the periphery of the cavity chamber wall as shown in FIGS. 6*a* and 6*b*. The length of each internal cavity stub transmission line 49 as shown in FIG. 2 can be varied by movement of its associated shorting piston 52. Also, it is advantageous to vary all the shorting pistons 45*a*, *b*, etc., in the external sub transmission lines 44*a*, *b*, etc., so that the lengths of these external stubs are changed in concert with each other. Pistons 45, FIG. 2, can be ganged to accomplish simultaneous adjustment thereof. Such an arrangement corresponds to the movement of the two stub pistons in a double-stub tuner. Furthermore, with all ports terminated by matching loads or by equal length cables with matching loads on the far ends thereof, the outputs will all be co-phased with one another since all derive from the same multi-port periphery and thereby from application of the inputs to the same axial locations along the standing wave patterns set up in the outer chamber of the multi-port output cavity.

A further explanation of the operation of power splitter 14 with reference to FIGS. 2, 3, 4 and 5 will now be presented. The reason that the capacitive disc splitter functions is that it form part of an L matching network or, more aptly in this case, a mis-matching network. That is, capacitive disc 40 functions as a capacitor in series with the inner conductor 27 of the coaxial output port transmission line 26. However, in shunt with the outer conductor 29 is the transmission line stub 49*a* formed by the remainder of the output cavity which is terminated by the short circuiting piston 52, usually called the tuning piston of the cavity. This capacitor and the shunting stub transform the input impedance of the load-terminated output transmission line 26 so that, when the combination is translated by the top end of the cavity, acting again as a TEM coaxial transmission line, the input impedance appears between the screen grid 30 and plate 28 as the conjugate to the complex impedance of the equivalent generator located there. In this manner, the maximum possible output power is drained from the equivalent generator. With this arrangement, the equivalent generator is not matched to the 50 ohm surge impedance of the outgoing coaxial transmission line 26 but, rather, this 50 ohm based input impedance is so mis-matched that, when operated on as described, it appears as the complex conjugate to the internal impedance of the equivalent generator with the result that the maximum possible output power flows smoothly through the nearly lossless reactive matching elements from equivalent generator to load.

This occurs, of course, only when the elements of the equivalent L-matching network are so chosen and so located that the desired mis-match is obtainable. With reference to FIG. 3, for example, the shunt stub transmission line 49 forms a common input reactance to each of the several mis-matching L networks, each of which is composed of a series capacitor formed by a capacitive disc 38, 40, etc., and an inductance formed by the associated external shunt stub line 44*a*, *b*, etc.

In FIG. 3, the situation is shown where the internal cavity shunt stub line 49 is an odd multiple of a quarter wave length, so that this internal stub line is not present electrically, being equivalent to the well known metallic insulator. In such a case, each external load is so transformed electrically by its associated shunted external stub line 44 and its individual series capacitor 38, 40, etc., that all of the transformer loads in aggregate appear at the power splitter output ports as the appropriate complex conjugate admittance necessary for developing the maximum possible power output from the generator formed by the screen grid 30 and plate 28. The equivalent Smith chart shown in FIG. 4 illustrates the graphical transition from match into desired mis-match. By varying the length of the external stub lines 44 and the adjustment of the series capacitive discs 38, 40, etc., mismatched external loads can also be translated into the necessary complex conjugate, thus providing for maximum power transfer from the internal cavity generator into a mis-match load rather than only into the theoretical match load.

Another alternative is shown by the equivalent electrical circuit in FIG. 5. Here the external shunt stub line 44 is made anti-resonant, so that the external loads, each with its own series capacitance, combine with the input susceptance of the internal stub line 49 in such manner that the translated load appears at the internal generator as the complex conjugate of its own internal impedance.

It is to be realized that only two variables are needed to accomplish a given match or, in this case, a given mis-match. These not only provide resonance necessary for voltage amplification but they also set the definite resistance or conductance level postulated by match. Since cavity splitter 14 necessarily has three variables, two of them may be ganged in practice, or else one may be semi-permanently fixed over a certain frequency range while only the other two are varied.

A power splitter having capacitive output taps 38 and 40 is a particularly advantageous embodiment for practical reasons, but it is not the only coupling device which can be used. When capacitive taps are employed UHF power splitter 14 can be employed either as a straight single-port power amplifier or as an active multiple UHF power divider having five outputs, for example, as shown in FIG. 6*a*. Such a structure is advantageous in that each cavity resonator device may be interchanged with the others for use either as a power spitter or as a conventional single output port UHF amplifier.

Rather than a non-directional voltage coupler such as the capacitive disc power splitter as shown in FIG. 2, directional couplers can be used. Two such directional devices are shown schematically in FIGS. 7*a* and 7*b*. Each coupler is assumed to be axially short in comparison with the wave length of the UHF signal, these coupling arrangements being closely akin to the conventional resistive-loop contra-directional coupler. Although the obvious advantage of such devices is the directivity associated with them, they also present the disadvantage that arbitrarily close couplings are not possible. Hence, although the use of such devices is possible, the use of the mechanically simple capacitive disc structure is generally of more advantage.

A further novel feature incorporated in a UHF transmitting system embodying this invention is illustrated in FIG. 8. A UHF power amplifier 70, corresponding to either of the power amplifiers 16 or 18 shown in FIG. 1, is regulated by a power level bridge connected to the output of the power amplifier so that the amplitude of the output voltage of the amplifier is maintained constant. A capacitive disc or tap 72 couples the UHF power through a transmission line 74 to a load 76, such as an antenna element. The amplifier output voltage is tapped off line 74 and rectified by diode 78. The rectified power voltage is then compared in a comparator 80 with a constant level D.C. control voltage applied across terminals 81*a* and 81*b*. The output of the comparator is fed to the grid 82 of a shunt regulator tube 84, the output voltage of which is fed by conductor 86 to alter the bias on the screen grid 88 of power amplifier 70. The output of tube 84 could also be applied to an indicating device or to a servo motor which would in turn adjust the coupling of capacitive disc 72 in amplifier 70 in order to maintain the output voltage of the amplifier constant.

Another novel feature incorporated in a UHF transmitting system in accordance with the invention is the provision of phase shifters connected between the power amplifiers and the antenna elements. Referring first to that portion of FIG. 9 which shows a complete UHF transmitting system for a three-element antenna array incorporating all the novel features of this invention, there are shown adjustable phase shifters 100 and 102 in the form of mechanically controlled line stretchers which are connected to transmission lines leading to antenna elements 104 and 106, respectively. A voltage coupler 108 is connected between phase shifter 100 and antenna elements 104 and a voltage coupler 110 is connected between phase shifter 102 and antenna element 106. A voltage coupler 112 is also connected to the input of antenna element 114. These voltage couplers can be either non-directional or directional in coupling action. The UHF signal appearing on the transmission line connected to antenna 114 is taken as the phase reference and is tapped off by means of coupler 112 and applied to the phase comparators 116 and 118 which are also connected to couplers 108 and 110, respectively. Therefore, the UHF signal applied to antenna 104 is compared with the phase reference signal in phase comparator 116 and the UHF signal applied to antenna 106 is compared with the phase reference signal in phase comparator 118. Connected to the output of phase comparator 116 is a servo amplifier 120, the output of which is connected to servo motor 122 which in turn drives phase shifter 100. In like manner, a servo amplifier 124 is driven by phase comparator 118 and its output is connected to servo motor 126 which drives phase shifter 102. When the phase of the UHF signal applied to either antenna 104 or 106 is different from the reference phase of the signal applied to antenna 114, an error voltage is developed by the appropriate phase comparator and applied to its servo amplifier and the output of that amplifier then energizes the corresponding servo motor to adjust its associated phase shifter to rebalance automatically the relative phases of the three UHF signals so that all three signals are of the same phase.

The action of the phase shifters described above is such as to maintain all the phases equal. It is sometimes desirable, however, to provide phase grading to alter the directivity of the beam emitted by the antenna array. In this case, phase control voltages can be applied to the lines 128 and 130 which are connected to servo amplifiers 120 and 124, respectively. In effect, these control voltages create a false servo zero corresponding to a prescribed phase relation between the UHF signals appearing on the two associated transmission lines. In this manner, phase grading of the signals can be provided to skew the main antenna array lobe or to synthesize a prescribed antenna pattern. Instead of line stretchers, other controllable phase shifters, such as ferrite phase shifters, could be employed, in which case servo motors are not required and the output of the servo amplifiers can be fed directly to the control coils of the ferrite phase shifters.

FIGS. 10*a* and 10*b* show actual voltage couplers and phase comparators which can be used to accomplish the phase control described in connection with FIG. 9. In FIG. 10*a*, voltage couplers of the non-directional type are illustrated. Non-directional voltage couplers 140 and 142 are associated with transmission lines 144 and 146, respectively. Coupler 140, for example, is provided with a capacitive tap 148 which samples the UHF signal appearing on line 146 and transmits it via line 150 to phase comparator 152. Voltage appearing on line 150 is capacitively coupled to the phase comparator circuit by means of the capacitive disc 154. An analysis of the circuit in FIG. 10*a* shows that when (1) The couplers 140 and 142 are of the same type (capacitive probe, inductive loop, directional, etc.);

(2) Equal voltage couplings are provided by capacitive discs 148 and 149; and (3) The cross-coupling line 150 is bilaterally matched, i.e., each end is terminated in its matching load $Z_0$, then the voltage at the electrical center of line 150 is proportional to the phase angle through $$V_{\mathrm{CL}}=K'(1-e^{j\phi})\ V_1\ \text{(volts)} \tag{3}$$

and the current in the electrical center line is also proportional to the phase angle but through $$I_{\mathrm{CL}}=K''(1-e^{j\phi})I_1\ \text{(amperes)} \tag{4}$$

The expressions $V_{\mathrm{CL}}$ and $I_{\mathrm{CL}}$ refer to the voltage and the current present at the centerline of the bridged transmission line segment; they are measured in volts and amperes, respectively. One leads the other by a phase angle of $\pm\phi$ electrical degrees. Complex numerics K′ and K″ link this voltage and current to the incident voltage $V_1$ and the incident current $I_1$ present at the coupling points in each of the main transmission systems. These characteristics can be used with a Foster-Seeley phase discriminator 156 to measure phase between the current and voltage at the center of the auxiliary line, and thereby derive an S-characteristic. The outputs of the phase comparator are then applied to a servo amplifier 158 which amplifies the error voltage between the phases and applies it to the corresponding servo motor as previously described.

FIG. 10*b* is very similar to FIG. 10*a* with the exception that directional couplers 158 and 160 are shown.

Referring again to FIG. 9, showing the complete UHF transmitting system incorporating all the novel features of this invention, a UHF signal is applied to the input 170 of an active three-output-port power splitter 172 so that three UHF signal portions are each applied to one of the lines 174*a*–174*c*. Each of these lines is in turn connected to an associated power amplifier 176. A power level bridge 178 is connected to the output of each power amplifier 176 for controlling the voltage amplitude of the output thereof. As previously described, these power bridges can be utilized to maintain constant the outputs of all the amplifiers. In addition, power level control voltages, similar to the phase control voltages used in the phase shifting circuits, can be applied to the lines 180 in order to set the outputs of the power amplifiers 176 individually at different levels. By controlling the power levels of the individual amplifiers 178, it is possible to create a tapered amplitude pattern in the train of output powers applied to the multi-element antenna array. In the preferred embodiment, however, the uniformly tapered array is taken to be that with the sharpest possible main lobe and, therefore, equal power outputs from the power amplifiers 178 are desired. Therefore, all power level control voltages are connected to a common reference point.

It should be specifically understood that all transmission lines in this system are considered to be matched.

While the invention has been illustrated and described with reference to preferred embodiments, it will be understood that various omissions and substitutions and changes in the form and details of the systems illustrated, and in their operation, can be made by those skilled in the art without departing from the scope of the invention as defined in the appended claims.

What is claimed is:

1. A power transmission system comprising, generating means for providing an electromagnetic wave of a predetermined frequency, an active power splitter of the resonant cavity type for dividing said electromagnetic wave into a plurality of signal portions of said predetermined frequency, means for coupling said generating means to said splitter, a plurality of radiating elements arranged in an array, a power amplifier of variable gain connected between each of said radiating elements and said splitter to provide an amplified signal portion to each of said radiating elements, said splitter being adjustable to provide a proper impedance match for said amplifiers, and a power level bridge associated with each of said power amplifiers to control the gain thereof and maintain a desired constant signal level at said radiating elements regardless of the magnitude of said signal portion.

2. A UHF power transmitting system comprising generating means for providing a UHF signal of a predetermined frequency, a cavity-type amplifier having a single input port and a plurality of output ports, means for applying the signal to said input port to provide at each of said output ports a selected portion of said signal, a plurality of UHF radiating elements arranged in an array and coupling means for applying each selected signal portion to a corresponding one of said radiating elements, said coupling means including a power level bridge operative to maintain a desired signal level at each of said radiating elements and a plurality of closed loop, phase controlling devices operative to maintain controllable phase relationships among signal portions applied to said radiating elements.

3. A UHF power transmitting system comprising generating means for providing a UHF signal of a predetermined frequency, an active power splitter of the resonant cavity type for dividing the UHF signal into a plurality of signal portions of said predetermined frequency, means for coupling said UHF signal to said splitter, a plurality of output capacitative discs disposed within the cavity of said splitter, means for retracting from the cavity selected output capacitative discs to alter the number of signal portions into which the UHF input signal is divided, a plurality of UHF power radiating elements arranged in an array, and means connecting each of said output capacitative discs to a corresponding one of said radiating elements so that UHF power is transmitted to said array over a plurality of parallel paths.

References Cited in the file of this patent

UNITED STATES PATENTS

| | | |
|---|---|---|
| 1,721,627 | Horle | July 23, 1929 |
| 1,806,666 | Brown | May 26, 1931 |
| 2,052,339 | Dallenbach | Aug. 25, 1936 |
| 2,298,930 | Decino | Oct. 13, 1942 |
| 2,484,562 | Gardiner | Oct. 11, 1949 |
| 2,497,958 | Peterson et al. | Feb. 21, 1950 |
| 2,562,239 | Meisenheimer | July 31, 1951 |
| 2,867,726 | Priest | Jan. 6, 1959 |
| 2,901,599 | Leyton | Aug. 25, 1959 |
| 2,931,992 | Caroselli | Apr. 5, 1960 |

FOREIGN PATENTS

| | | |
|---|---|---|
| 812,547 | Great Britain | Apr. 29, 1959 |

OTHER REFERENCES

Terman: Electronic and Radio Engineering, pp. 115–117, 1955.